US005483749A

United States Patent [19]

Hepworth

[11] Patent Number: 5,483,749

[45] Date of Patent: Jan. 16, 1996

[54] MEASURING AND CUTTING APPARATUS

[75] Inventor: Paul S. Hepworth, Guildford, England

[73] Assignee: Plasplugs Limited, England

[21] Appl. No.: 937,824

[22] PCT Filed: Apr. 22, 1991

[86] PCT No.: PCT/GB91/00626

§ 371 Date: Mar. 5, 1993

§ 102(e) Date: Mar. 5, 1993

[87] PCT Pub. No.: WO91/16184

PCT Pub. Date: Oct. 31, 1991

[30] Foreign Application Priority Data

Apr. 20, 1990 [GB] United Kingdom .................... 9008858

[51] Int. Cl.[6] ................................ G01B 5/14; B28D 1/32

[52] U.S. Cl. .................... 33/527; 33/DIG. 20; 125/23.02

[58] Field of Search ..................... 33/526, 527, DIG. 20, 33/419; 125/23.02

[56] References Cited

U.S. PATENT DOCUMENTS

| | | | |
|---|---|---|---|
| 1,995,741 | 3/1935 | Granite . | |
| 2,490,989 | 12/1949 | Williams . | |
| 2,619,173 | 11/1952 | Crain . | |
| 2,770,043 | 11/1956 | Kwiecinski | 33/DIG. 20 |
| 3,718,980 | 3/1973 | Poulos | 33/DIG. 20 |
| 4,860,723 | 8/1989 | Fortin | 33/526 X |
| 5,188,013 | 2/1993 | Cardinale | 33/527 X |

FOREIGN PATENT DOCUMENTS

| | | | |
|---|---|---|---|
| 2087316 | 12/1971 | France . | |
| 8914776.6 | 5/1990 | Germany . | |
| 2185115 | 7/1987 | United Kingdom | 33/527 |
| 2218375 | 11/1989 | United Kingdom . | |
| 2227564 | 8/1990 | United Kingdom | 33/526 |

*Primary Examiner*—Alvin Wirthlin
*Attorney, Agent, or Firm*—Basile and Hanlon

[57] ABSTRACT

Apparatus for cutting tiles or similar items to size comprises a measuring device having first and second measuring members which are movable towards and away from each other to set a required size to which a tile is to be cut, a cutting device comprising a base, a cutter, and a guide for guiding movement of the cutter along a defined path across the base, and a formation on the base to receive the first measuring member of the measuring device and to position the same in alignment with the defined path, whereby a tile placed in edge contact with the second measuring member of the measuring device is automatically positioned for cutting substantially to the required size by the cutter. The formation preferably comprises a recess in the base, such that when received in the recess an upper surface of the first measuring member lies substantially flush with an upper surface of the base.

6 Claims, 5 Drawing Sheets

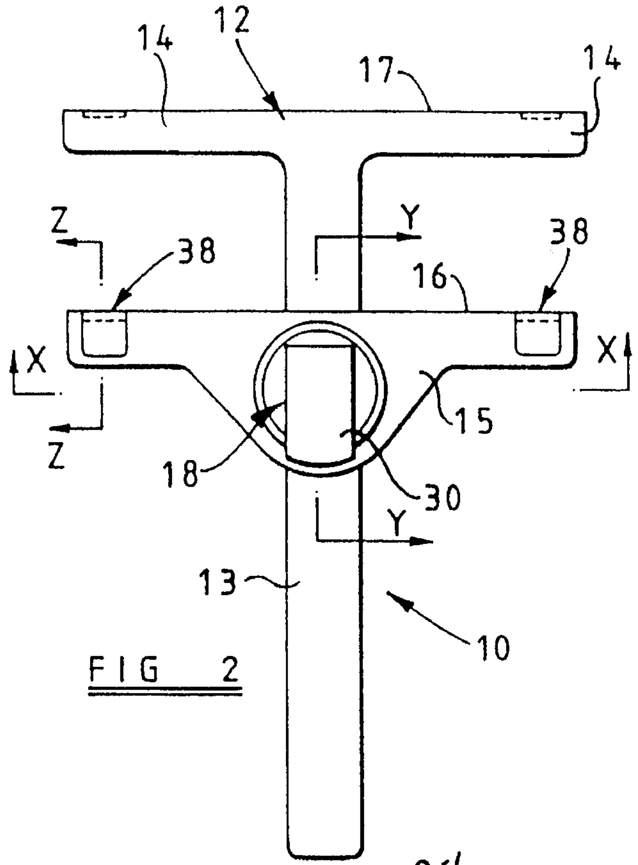
FIG 2
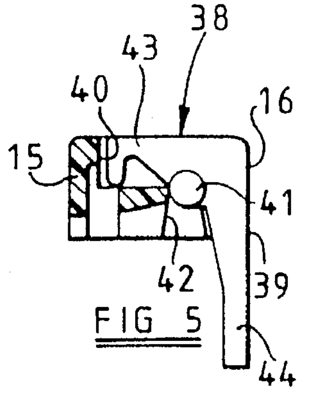
FIG 5
FIG 6
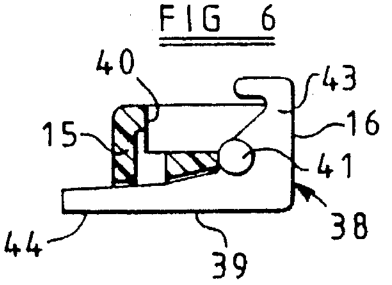
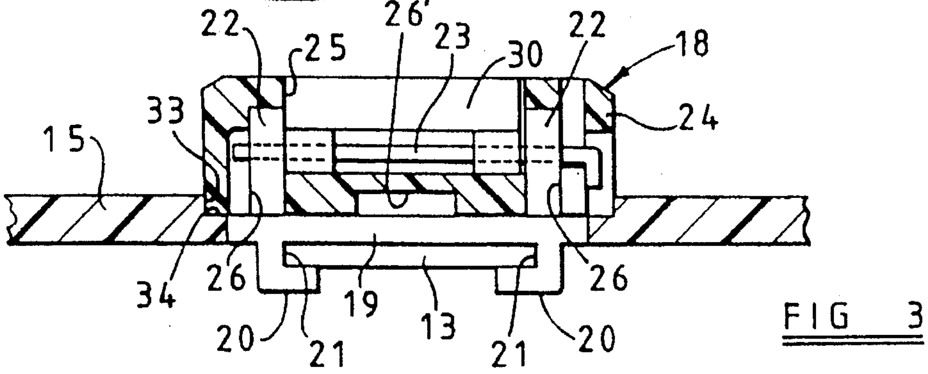
FIG 3
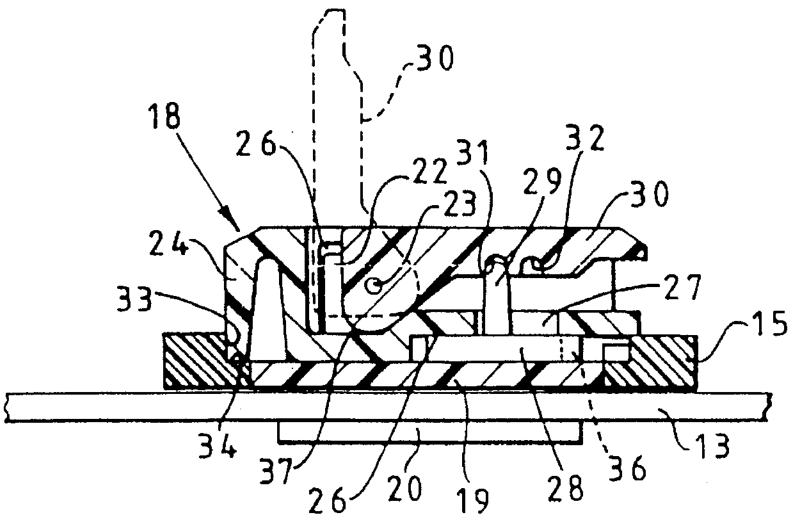
FIG 4

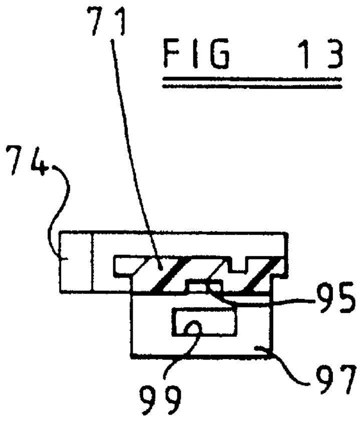
FIG 13
FIG 14
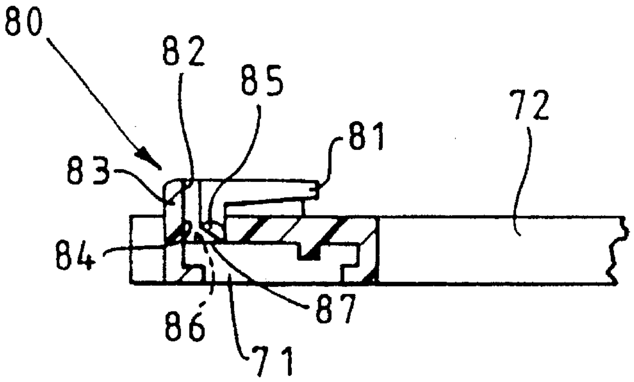
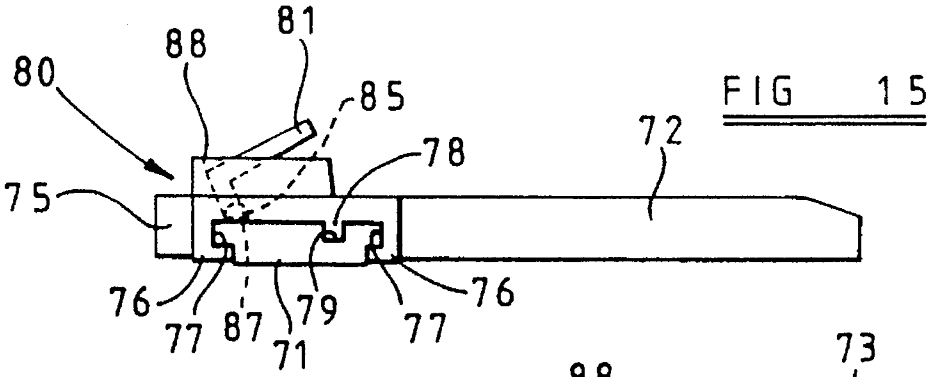
FIG 15
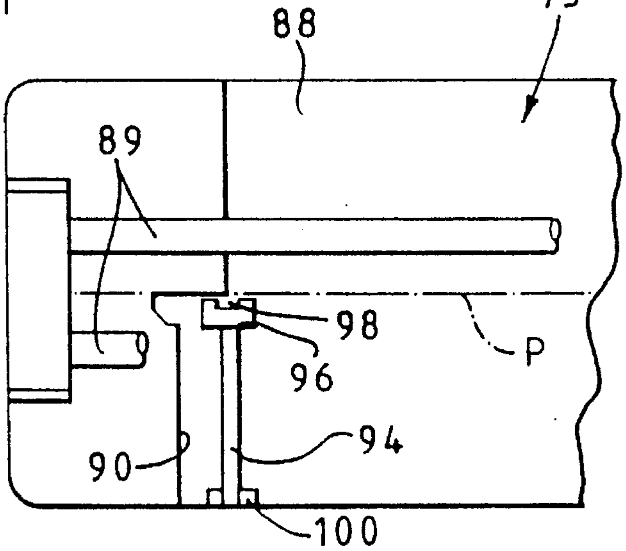
FIG 16
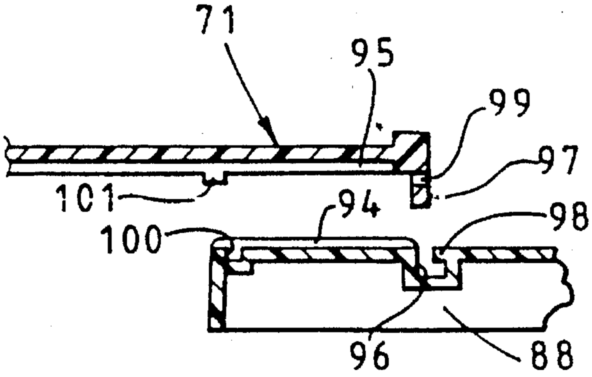
FIG 17

MEASURING AND CUTTING APPARATUS

FIELD OF THE INVENTION

This invention relates to apparatus for measuring and for cutting tiles and the like to an size.

SUMMARY OF THE INVENTION

According to a first aspect of the present invention, there is provided an apparatus for cutting tiles or similar items to size, comprising a measuring device having first and second measuring members which are movable towards and away from each other to set a required size to which a tile is to be cut, a cutting device comprising a base, a cutter, and guide means for guiding movement of the cutter along a defined path across the base, and a formation on the base to receive the first measuring member of the measuring device and to position the same in alignment with said defined path, whereby a tile placed in edge contact with the second measuring member of the measuring device is automatically positioned for cutting substantially to the required size by the cutter.

Preferably, the formation comprises a recess in the base. When received in the recess, an upper surface of the first measuring member desirably lies substantially flush with an upper surface of the base.

In one embodiment, each measuring member comprises an arm member having at least one lug depending therefrom in a direction generally perpendicular to the plane of relative movement between the measuring members. In another embodiment, each measuring member comprises a finger element which extends in a direction generally in the plane of the relative movement between the measuring members.

The first measuring member can include a projection which locks into a recess in the base of the cutting device, to prevent the measuring device from tipping relative to the base when the first measuring member is received by said formation.

The measuring device can include locking means operable to lock the measuring members against relative movement, the locking means including a manually operable locking member which is movable between a lock position and a release position. Desirably, the locking member is pivotable between said lock and release positions, preferably about an axis generally parallel to the plane of relative movement between the measuring members.

Advantageously, the locking means is in the form of a clamp, and clamps the measuring members together when the locking member is in its lock position, preferably by means of a cam surface on the locking member.

Conveniently, one of the measuring members includes a slot or recess in which the other measuring member is slidably received, and said other measuring member is urged against a wall of the slot or recess when the locking member is in its lock position. For example, said one of the members can include a pair of opposed recesses which receive respective edge portions of said other member.

Desirably, the cam surface comprises a generally cylindrical element having a flat portion thereon.

In an alternative arrangement, the measuring members of the measuring device are movable both rectilinearly and angularly relative to one another. In this case, the measuring device preferably takes the form as defined below.

Conveniently, the cutter serves to score a parting line on the tile, the cutting device also includes jaw means for parting the tile along said parting line, and said second measuring member of the measuring device has at least one upstanding projection thereon with which a side edge of the tile can be engaged during the parting operation. Advantageously, each projection is formed by a lug which is mounted on the second measuring member for pivotal movement between a first position wherein it upstands from the measuring member and a second position wherein it lies generally flat against (and preferably flush with) the measuring member.

Desirably, the lug is formed by the longer leg of a generally L-shaped component, and a shorter leg of said component forms a further lug which upstands from the opposite side of the measuring member when the first-mentioned lug is in its second position, the further lug lying generally flat against (and preferably flush with) the measuring member when the first-mentioned lug is in its first position.

According to a second aspect of the present invention, there is provided a measuring device comprising a pair of measuring members mounted for both rectilinear and angular movement relative to one another, first locking means operable to lock the measuring members against relative movement and including a manually operable first locking member movable between a lock position and a release position, and second locking means operable to lock the measuring members against relative angular movement and including a manually operable second locking member movable between a lock position and a release position, the first locking member when in its lock position preventing movement of the second locking member between said lock and release positions.

Preferably, the first locking member includes a pair of recesses for receiving the second locking member in the latter's lock and release positions respectively.

Desirably, the second locking member is rendered inaccessible by the first locking member when the latter is in its lock position, and is exposed for operation when the first locking member is in its release position.

Advantageously, the first locking member is pivotable between its lock and release positions, preferably about an axis generally perpendicular to the axis of relative angular movement between the measuring members.

Conveniently, the second locking member is slidable between its lock and release positions.

Desirably, one of the measuring members comprises a stem portion and at least one arm extending laterally therefrom, and the other measuring member is mounted on the stem portion for rectilinear and angular movement relative thereto.

Preferably, the first locking means is in the form of a clamp, and clamps the measuring members together when the first locking member is in its lock position. The clamping action is advantageously performed by means of a cam surface on the first locking member.

Conveniently, the first locking means includes a clamp element mounted on one of the measuring members and including a slot or recess in which the other measuring member is received, and said other measuring member is urged against a wall of the slot or recess when the locking member is in its lock position. For example, said one of the measuring members can include a pair of opposed recesses which receive respective edge portions of said other measuring member.

Preferably, the second locking means comprises a mounting element which is angularly fixed relative to one of the measuring members and which is rotatably received in a recess or opening in the other measuring member, and the second locking member is carried by the mounting element for movement towards and away from a side wall of the recess or opening.

Conveniently, in a particular relative angular orientation of the measuring members (preferably when they are mutually parallel), the second locking member is engageable with a formation on said other measuring member to lock the measuring members in that relative orientation.

Desirably, the second locking member is slidable in a recess on the underside of the mounting member, and a manually graspable lug on the second locking member extends through a slot in the mounting member.

Preferably, the locking member is carried by the clamping element, and the aforementioned cam surface acts upon the mounting element.

Advantageously, the first locking member is received in a recess in the mounting element, and the cam surface acts upon a base of the recess.

According to a third aspect of the present invention, there is provided an apparatus for cutting tiles and the like, comprising a base, at least one guide rail extending across the base, a cutter mounted on the guide rail for movement therealong, first retaining means for retaining one end of each guide rail, and second retaining means for retaining an opposite end of each guide rail, the first retaining means comprising a hollow molded member having first and second side walls facing respectively towards and away-from the first retaining means, the first and second side walls having mutually aligned apertures therein through which each guide rail passes, the external surface of the hollow molded member having no undercut surfaces in an upward direction, the internal surface of said member having no undercut surfaces in a downward direction, said surfaces being coplanar at the apertures, the first retaining means also including a cap member detachably secured to the hollow molded member so as to block off each aperture in the second side wall.

Preferably, the second retaining means includes a blind aperture which receives each guide rail end-on.

Advantageously, the second retaining means comprises a further hollow moulded member having a side wall facing the first retaining means, said side wall having an aperture therein to receive each guide rail, the external surface of the further hollow molded member has no undercut surfaces in an upward direction, the internal surface of said further member has no undercut surfaces in a downward direction, and said surfaces are coplanar at each aperture.

The invention will now be further described, by way of example only, with reference to the accompanying drawings, in which:

FIG. 2 is a plan view of a measuring device which forms part of the apparatus shown in FIG. 1;

FIG. 3 is a partial-sectional view along the line X—X in FIG. 2;

FIG. 4 is a partial-sectional view along the line Y—Y in FIG. 2;

FIGS. 5 and 6 are partial-sectional views along the line Z—Z in FIG. 2, showing a locating device in two alternative positions;

FIG. 13 is a sectional view taken along the line B—B in FIG. 12;

FIG. 14 is a sectional view taken along the line C—C in FIG. 12;

FIG. 15 is a side view of the measuring device shown in FIG. 12;

FIG. 16 is a partial plan view of a cutting device which also forms part of the second embodiment of the invention; and FIG. 17 is a sectional view of the apparatus of FIGS. 12 to 16.

DETAILED DESCRIPTION OF THE PREFERRED EMBODIMENT

Figure 1:
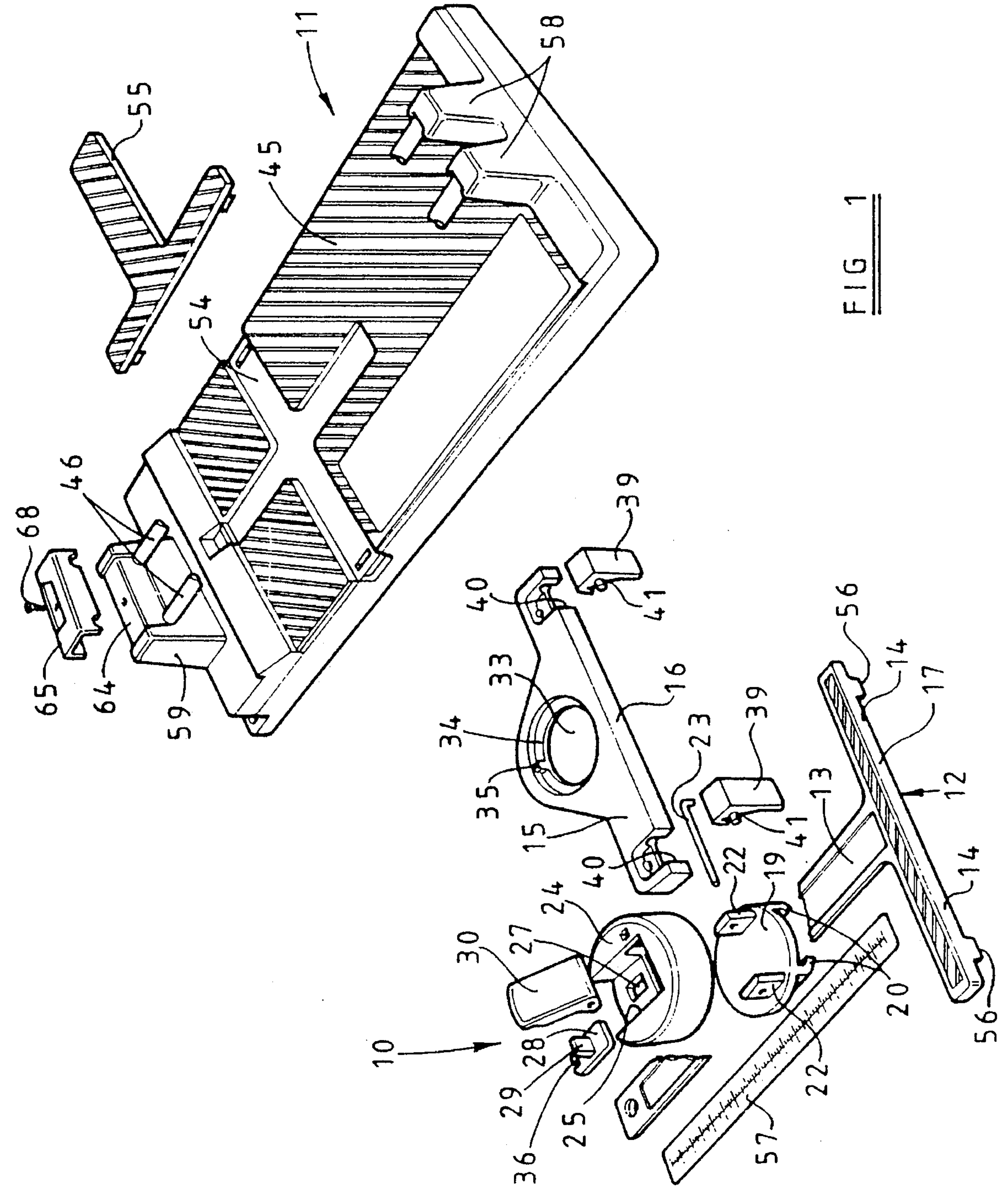
FIG. 1 is an exploded perspective view of a first embodiment of an apparatus for cutting tiles to size, according to the present invention, showing a cutting device of the apparatus partly broken away.

Referring first to FIGS. 1 and 2, a first embodiment of the apparatus comprises generally a measuring device 10 which is used to measure a size of tile to be cut (e.g. to fill a gap between the end of a run of tiles and a corner of a room), and a cutting device 11 which is used to score a line on the tile at the appropriate position and subsequently to snap the tile to the required size. The measuring device 10 is composed of a first measuring member in the form of an arm member 12 of T-shaped configuration having a stem portion 13 and two arm portions 14 extending laterally therefrom. A second measuring member in the form of an arm member 15 is mounted on the stem portion 13 for both rectilinear and angular movement relative to the member 12. The rectilinear movement allows a measuring edge 16 on the member 15 to be moved towards and away from a measuring edge 17 on the member 12, while the angular movement enables the edge 16 to be angled relative to the edge 17.

Relative movement between the members 12 and 15 is controlled by means of a clamping and locking device 18 disposed centrally of the arm member 15. This device is shown in detail in FIGS. 3 and 4, and comprises a disc-like clamping element 19 having a pair of feet 20 depending therefrom, the feet being provided with opposed recesses 21 which slidingly receive opposed edges of the stem portion 13 of the arm member 12. Upstanding from the clamping element 19 are a pair of laterally spaced lugs 22 which are apertured to receive a pivot pin 23.

Surmounting the clamping element 19 is a mounting element 24 which is of generally cylindrical configuration but which is of slightly larger diameter than the clamping element 19. A rectangular recess 25 is provided in an upper surface of the mounting element 24, while further recesses 26 extend from a bottom surface of the element 24 and communicate with the recess 25 on either side of the latter. The lugs 22 on the clamping element 19 are received in the recesses 26, respectively, such that the pivot pin 23 extends across the recess 25.

In its bottom surface, the mounting element 24 has a further recess 26' which communicates with the recess 25 by way of a slot 27. Received in the recess 26' is a locking member 28 having an upstanding lug 29 which extends through the slot 27, the arrangement being such as to allow limited sliding movement of the locking member 28 generally radially of the mounting element 24, by manual operation of the lug 29. The member 28 is thus movable between a locking position wherein the lug 29 abuts the right-hand end of the slot 27 (as viewed in FIG. 4), and a release position wherein the lug abuts the left-hand end of the slot.

Disposed within the recess 25 in the mounting element 24 and pivoted to the pin 23 is a cam lever 30. The lever 30 is pivotable between a lock position wherein it lies substantially flush with the upper surface of the mounting element 24, and a release position as depicted in broken lines in FIG. 4. In its underside, the lever 30 is provided with two spaced recesses 31 and 32. When the lever 30 is in its lock position, it lies directly over the lug 29 of the locking member 28 and receives the lug in the recess 31 or 32 according to the position of the member 28. The lever 30 thus renders the lug 29 inaccessible at this time, and serves to hold the locking member 28 selectively in its lock and release positions.

The clamping and locking device 18 is rotatably received in a circular opening 33 in the arm member 15. The opening 33 is stepped to define an upwardly-facing annular shoulder 34, which is provided at one point on its circumference with a locking formation 35. This formation is engaged by a recess 36 in the locking member 28 when the latter is in its lock position. The mounting element 24 rests upon the shoulder 34, while the clamping element 19 is received within the smaller diameter part of the opening 33. The components are dimensioned so that the feet 20 hold the arm member 12 with the upper surface of the stem portion 13 in close proximity to the underside of the arm member 15.

Locking of the relative movement between the arm members 12 and 15 is controlled by the lever 30, which acts in co-operation with the mounting element 24 and the clamping element 19. More particularly, the lever 30 has a cam surface 37 which bears against a base of the recess 25 and which (when the lever is in its lock position) exerts an upward force on the clamping element 19 by way of the pivot pin 23 and the lugs 22. This in turn urges the stem portion 13 of the arm member 12 into tight engagement with the underside of the arm member 15 so that the stem portion 13 is effectively clamped between a base wall of each recess 21 and the arm member 15. This clamping action is released when the lever 30 is moved to its release position, wherein the pressure exerted by the cam surface 37 on the base of the recess 25 is lessened. This also serves to expose the lug 29 for manual operation of the locking member 28.

Locking of the relative angular movement between the arm members 12 and 15 is controlled by the locking member 28. More particularly, when the arm members are disposed with their measuring edges 16 and 17 mutually parallel, the recess 36 in the locking member 28 is aligned with the locking formation 35 on the arm member 15. Consequently, movement of the locking member 28 into its lock position will engage these two components together and will hold the clamping and locking device 18 (and hence the arm member 12) against angular movement relative to the arm member 15. Movement of the locking member 28 to its release position will disengage these components and allow the arm members 12 and 15 to pivot comparatively freely relative to one another.

It will be manifest from the above description that the lever 30 pivots about an axis which is generally perpendicular to the axis of relative angular movement between the arm members 12 and 15.

Referring now also to FIGS. 5 and 6, the arm member 15 is provided with a pair of locating devices 38 adjacent its ends, respectively. Each device 38 comprises a generally L-shaped component 39 which is received within a configurated recess 40. The component 39 has laterally-extending pivot pins 41 which are a snap-fit within respective slots 42 in the sides of the recess 40, and which enable the component to pivot between respective positions shown in FIGS. 5 and 6. In the FIG. 5 position, a relatively short leg 43 of the component 39 lies flush with an upper surface of the arm member 15, while a relatively long leg 44 is flush with the measuring edge 16 and depends for a relatively large distance below a lower surface of the arm member 15. In the FIG. 6 position, the leg 43 is flush with the measuring edge 16 and upstands for a relatively short distance above the upper surface of the arm member 15, while the leg 44 lies flush with the lower surface of the arm member 15. The purpose of these locating devices 38 will be explained later.

Figure 7:
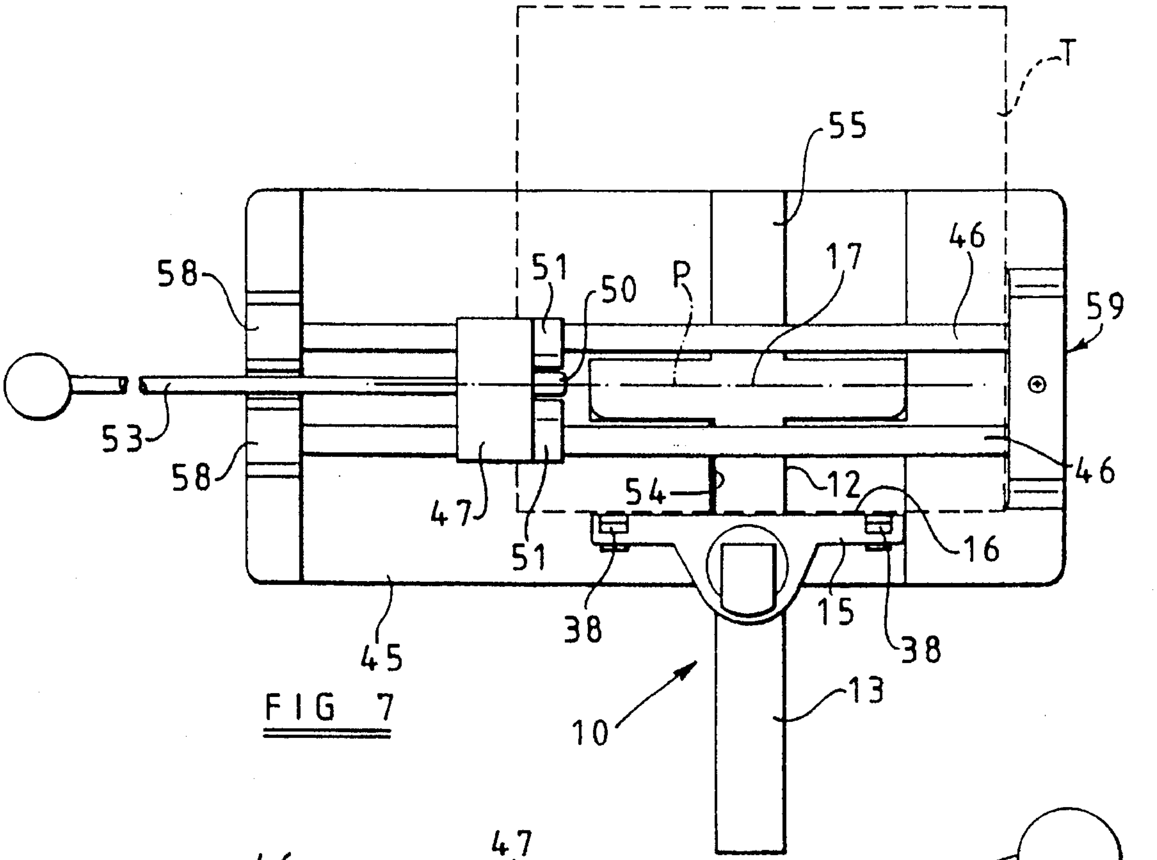
FIG. 7 is a plan view of the apparatus shown in FIG. 1.
Figure 8:
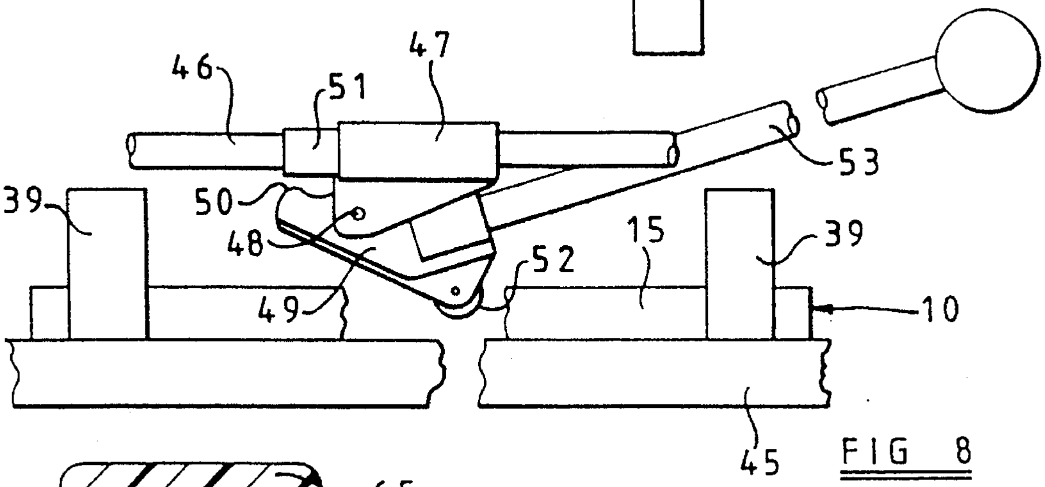
FIG. 8 is a partial side view of the apparatus.

FIGS. 7 and 8 show the cutting device 11 in detail, which is composed of a base 45 across which extend a pair of spaced, parallel guide rails 46. A carriage 47 is mounted on the guide rails 46 for sliding movement therealong, and carries a pivot pin 48 on which there is mounted a cutter member 49. To one side of the pivot pin 48, the member 49 is configured to form a jaw 50 which (as viewed in plan) is disposed between a pair of extension members 51 on the carriage 47. As will be described in more detail later, the jaw 50 co-operates with the members 51 to snap a tile along a desired parting line.

To the opposite side of the pivot pin 48, the member 49 is provided with a cutter wheel 52, which is used to score a tile to be parted. As the assembly of the carriage 47 and the member 49 is moved along the rails 46, the cutter wheel 52 follows a defined path P across the base 45. Such movement of the assembly, and also movement of the jaw 50 relative to the members 51, is effected by means of an elongate handle 53 attached to the cutter member 49.

The base 45 has formed therein a recess 54 of generally cruciform shape which is disposed symmetrically with respect to the path P of the cutter wheel 52. This recess can be regarded as two T-shaped recesses disposed back-to-back: each T-shaped recess is configured to receive selectively the arm member 12 of the measuring device 10 from one side or the other of the cutting device 11, while the other T-shaped recess can be blocked off using a blanking plate 55. The dimensions of the various components are arranged so that, when the arm member 12 is received within the recess 54, its upper surface lies generally flush with the upper surface of the base 45 and its measuring edge 17 is aligned with the path P.

The above-described apparatus is used in the following manner to cut a tile to a required size, for example to fill a gap remaining between a run of tiles on a wall and a corner between that wall and another. Firstly, the lever 30 of the measuring device 10 is moved to its release position to allow relatively free rectilinear movement between the arm members 12 and 15, and the locating devices 38 are put into their FIG. 5 positions. The measuring edge 17 of the arm member 12 is then engaged with the corner between the walls, and the arm member 15 is moved relative to the arm member 12 until the locating devices 38 engage with the end of the existing run of tiles. The lever 30 is then returned to its lock position to clamp the arm members 12 and 15 together with the measuring edges 16 and 17 at the required spacing.

Following this, the measuring device 10 is transferred to the cutting device 11 and the arm member 12 is inserted into the recess 54, after the locating devices 38 have been switched to their FIG. 6 positions. A tile T (shown in broken lines in FIG. 7) is then placed on the base 45 with one edge engaged with the edge 16 of the arm member 15, and the cutting device 11 is operated to score a line across the tile. This scoring operation is performed by grasping the handle 53 and moving the carriage 47 along the rails 46 with the cutter wheel 52 in contact with a front (upper) surface of the tile T.

The tile T is then removed from the base 45 and is inserted horizontally into the gap between the jaw 50 and the extension members 51, with the center of the jaw 50 aligned with the score line. The jaw 50 thus contacts the tile from below at the score line itself, whereas the members 51 contact the tile from above at locations spaced on either side of the score line. The handle 53 is then moved downwardly to exert an upward force on the jaw 50, which causes the tile to part along the score line. The resultant cut-off portion can then be inserted into the aforementioned gap at the end of the existing run of tiles.

It is often difficult to see the score line once made, and therefore a user may experience difficulty in achieving proper alignment between the jaw 50 and the score line. To facilitate this operation, the measuring device 10 can be removed from the recess 54 and then re-inserted upside down with the locating devices 38 back in their FIG. 5 positions, where they upstand from the base 45 for a rather greater distance than previously (see FIG. 8). The edge of the tile T can then be engaged with these devices during the parting operation, thereby automatically ensuring proper alignment of the jaw 50 with the score line.

As indicated previously, when the measuring device 10 is located in the recess 54, the measuring edge 17 of the arm member 12 is aligned with the path P of the cutter wheel 52. Consequently, the measuring edge 16 of the arm member 15 is spaced from the line P by a distance substantially equal to the width of the previously-measured gap. Therefore, the score line produced by the cutter wheel 52 is spaced from the tile edge by substantially the right distance to match the width of the gap.

In fact, the distance between the tile edge and the score line will be slightly less than the width of the gap, by an amount corresponding to the thickness of the L-shaped components 39 of the locating devices 38. This is because a rearward edge of each component 39 contacts the end of the tile run during the measurement operation, while the tile T is contacted by a forward edge of each component 39 during the scoring operation. The resultant difference in size between the cut-off tile portion and the gap enables a small space to be left between the cut-off portion and the end of the existing tile run, for grouting purposes.

In the above-described measuring operation, the arm member 15 is prevented from moving angularly relative to the arm member 12 by engagement of the locking member 28 with the locking formation 35. However, if the gap to be measured does not have parallel edges, then the locking member 28 can be moved to its release position during initial setting up of the measuring device 10. This will then allow the arm member 15 to be moved angularly to match any relative inclination between the edges of the gap. This relative inclination will then automatically be transferred to the score line during the subsequent cutting operation.

As depicted in FIG. 1, the arm member 12 is provided with locating lugs 56 on the measuring edge 17 for use when the measuring device 10 is used to measure e.g. a gap in a run of tiles. The arm member 12 can also be provided with a measuring scale 57 on its stem portion 13.

Referring back to the cutting device 11, each of the guide rails 46 is retained at one end in a respective mounting member 58, while its other end is retained in a common mounting member 59. This latter member is shown in detail in FIGS. 9 and 10, and comprises a hollow molding having side walls 60 and 61 facing respectively towards and away from the, mounting member 58. To receive each guide rail 46, the member 59 is provided with a pair of aligned apertures 62 and 63 in the side walls 60 and 61, respectively. Each of these apertures opens into a recess 64 in the exterior of the member 59 which extends over the top of the latter and partially down each side wall 60,61. The recess 64 receives a cap 65 which serves to block off the apertures 63 while leaving the apertures 62 open.

Figure 9:
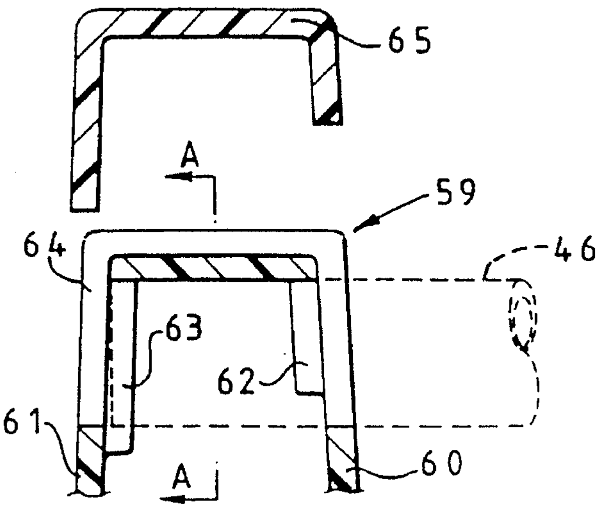
FIG. 9 is a sectional view of part of the cutting device of the apparatus.
Figure 10:
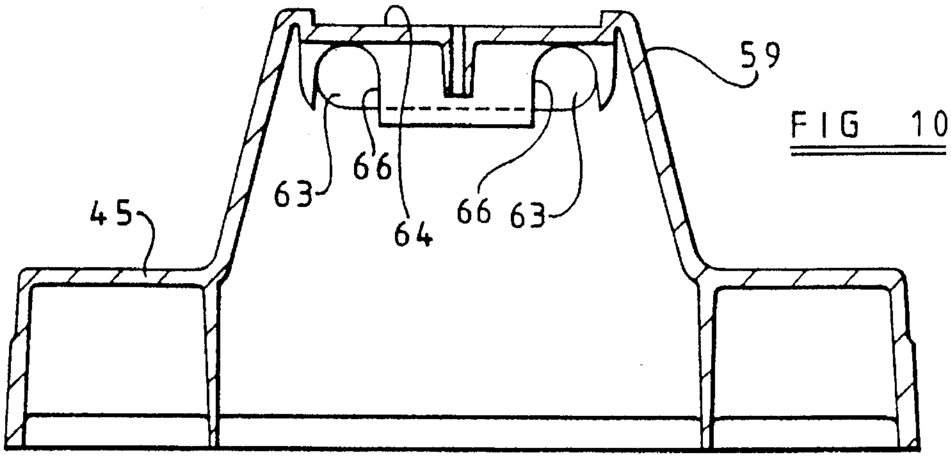
FIG. 10 is a section along the line A—A in FIG. 9.

The member 59 is produced by a molding operation using two mold components which are withdrawn respectively upwardly and downwardly as viewed in FIGS. 9 and 10. The two components are arranged to be in side contact in the areas which subsequently define the apertures 62 and 63, so that no side-coring is needed to form these apertures. As a consequence, the external surface of the member 59 has no undercut surfaces in an upward direction, the internal surface of the member has no undercut surfaces in a downward direction, and these surfaces are coplanar and coincident at the apertures 62 and 63. This in turn means that the apertures 63 are not circular, but rather have a vertical edge 66 on one side thereof.

Figure 11:
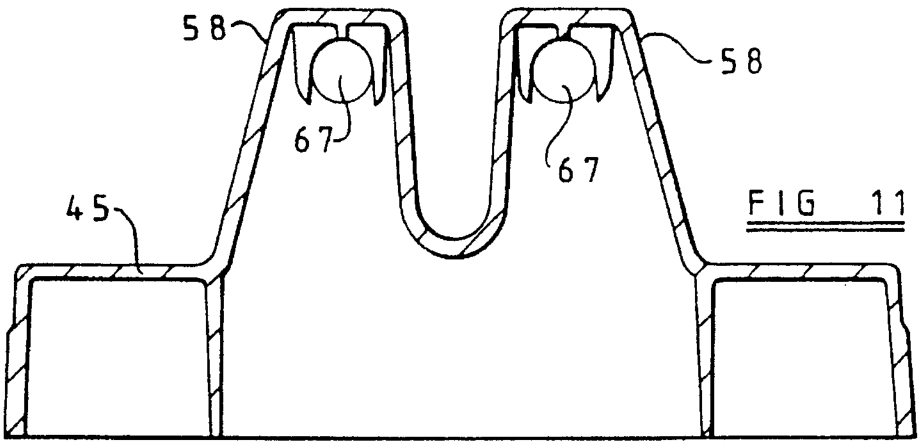
FIG. 11 is a sectional view of a further part of the cutting device.
Figure 12:
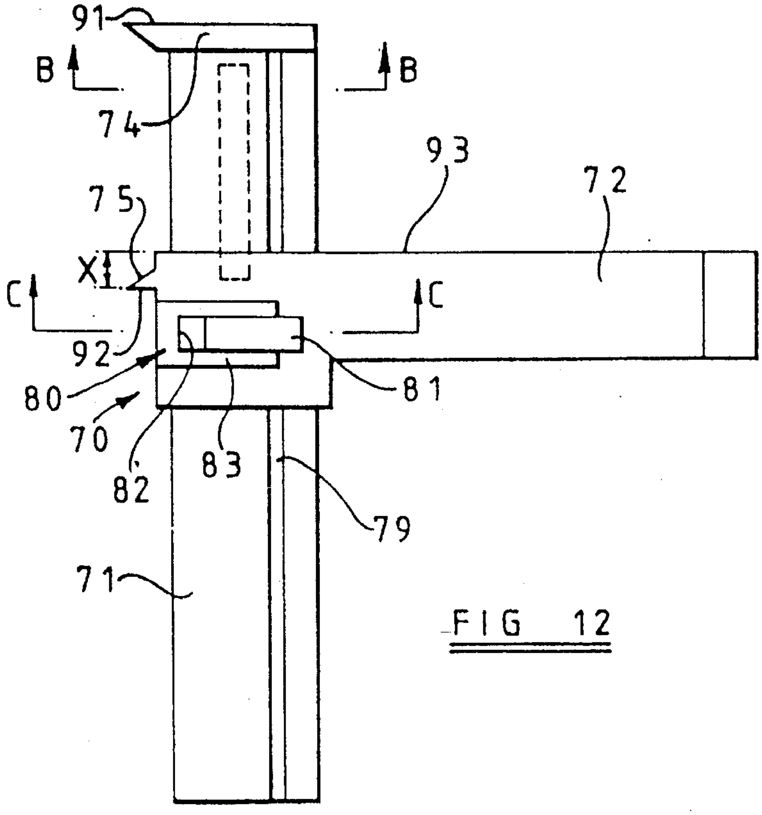
FIG. 12 is a plan view of a measuring device which forms part of a second embodiment of apparatus for cutting tiles to size, according to the present invention.

The mounting members 58 (shown in detail in FIG. 11) are moulded in substantially the same way as the member 59, except that apertures 67 are formed only in the side walls which face towards the member 59. All of the members 58 and 59 are formed integrally with the base 45, from which they upstand.

In order to assemble the cutting device 11, each rail 46 is inserted through the apertures 62 and 63 in the mounting member 59, through the carriage 47 and then into the blind aperture in the respective mounting member 58. The cap 65 is then placed over the member 59, thereby blanking off the apertures 63 and retaining the rails 46 in position. This construction enables the whole assembly to be held together by means of a single screw 68 (see FIG. 1) which secures the cap 65 to the member 59, which represents a considerable simplification over existing cutting devices of this type.

A second embodiment of the present invention is shown in FIGS. 12 to 17, and as before comprises a measuring device 70 composed of a pair of measuring members 71 and 72, and a cutting device 73. In this case, however, the measuring members are in the form of elongate arms which are disposed generally perpendicularly to one another, with the member 72 being slidable rectilinearly along the length of the member 71.

A finger element 74 projects beyond a forward edge of the member 71 at one end thereof. A further finger element 75 projects forwardly from an end of the member 72 by substantially the same distance as the element 74. Both of the finger elements 74 and 75 thus extend in a direction parallel to the plane of relative movement between the members 71 and 72. These elements are used to measure e.g. a gap to be filled by a tile, in a manner to be described later.

A pair of feet 76 depend from the underside of the member 72 and define opposed recesses 77 which slidably receive respective edges of the member 71. The member 72 also has a projection 78 which extends downwardly into the space between the feet 76 and which slidably engages in a slot 79 which runs the length of the upper surface of the member 71.

Sliding movement between the members 71 and 72 is controlled by a locking device 80 including a manually operable lever 81 which is movable between a lock position (shown in FIG. 14) and a release position (shown in FIG. 15). The lever 81 is of generally L-shaped configuration and is received in a recess 82 in a housing 83 on the member 72, which recess 82 communicates with the underside of the member 72 by way of an opening 84. The lever 81 has a pair of pivot pins 85 (only one shown) which extend laterally from an end of its shorter limb and which are received as a snap-engagement in respective recesses 86 (only one shown) in opposed side walls of the opening 84. Each pivot pin 85 is of generally circular cylindrical form, but includes a flat portion 87.

The pivot pins 85 act as cams to urge the members 71 and 72 into mutual clamping engagement. More particularly, when the lever 81 is in its release position, the flats 87 on the pivot pins 85 lie generally parallel to the upper surface of the members 71 and are slightly spaced therefrom. Under these conditions, the member 72 is free to slide along the member 71. However, when the lever 81 is moved to its lock position, one side of each flat 87 is urged into contact with the upper surface of the member 71, thereby pressing the member 71 downwardly relative to the member 72 and clamping the edges of the member 71 against base walls of the recesses 77. Under these conditions, the members 71 and 72 are clamped against relative movement.

The cutting device 73 is shown in FIG. 16, and is generally identical to the cutting device 11 described previously, being composed of a base 88, a pair of guide rails 89, and a cutter (not shown) which is movable along a path P. However, the recess 54 in the base 45 is now replaced by a recess 90 which is configured to receive the member 71 with the finger element 74 aligned with the cutter path P. When the member 71 is disposed in the recess 90, its upper surface is arranged to be generally flush with an upper surface of the base 88.

The apparatus is used to cut a tile to a desired dimension as follows. Firstly, the lever 81 of the measuring device 70 is moved to its release position so that the measuring members 71 and 72 are free to move relative to one another. The measuring device 70 is then oriented in a generally vertical plane so that the finger elements 74 and 75 can be inserted into the space whose size is to be measured. Following this, the members 71 and 72 are moved apart until a measurement edge 91 of the element 74 engages one side of the space, while a measurement edge 92 of the element 75 engages the other side.

The lever 81 is then returned to its lock position, and the measuring device 70 is transferred to the base 88 of the cutting device 73 with the member 71 being inserted in the recess 90. A tile to be cut (not shown) is then placed on the base 88 with an edge thereof engaged with a side edge 93 of the member 72. Because the measurement edge 91 of the finger element 74 is aligned with the cutter path P, the tile will then be positioned for cutting to substantially the desired size, on the same principles as described previously.

In fact, the tile will be cut to a slightly smaller dimension than that measured by the finger elements 74 and 75, so that a small gap will be left for grouting purposes as before. This difference in dimension arises because the measured dimension corresponds to the distance between the measurement edges 91 and 92 of the finger elements 74 and 75, while the tile is cut to a dimension corresponding to the distance between the edge 91 of the finger element 74 and the edge 93 of the member 72. The size of the gap for grouting will thus be determined by the distance x between the edges 91 and 93.

Referring now also to FIG. 17, to facilitate secure holding of the member 71 in the recess 90 during the cutting operation, a base of the recess 90 is provided with a ridge 94 which engages in a complementary slot 95 on the underside of the member 71. At one end of the ridge 94, the base of the recess 90 is also provided with a configurated slot 96 which receives a lug 97 depending from the member 71 in the region of the finger element 74, with a protrusion 98 in the mouth of the slot 96 locating through an opening 99 in the lug 97. At the other end of the ridge 94, the base of the recess 90 has a further slot 100 which receives a projection 101 depending from the underside of the member 71. Engagement between these respective parts serves to resist tipping of the measuring device 70 under the weight of a tile in cases where the member 72 overhangs the edge of the base 88.

I claim:

1. An apparatus for cutting tiles or similar items to size., comprising:

a measuring device having first and second measuring members which are movable towards and away from each other to set a required size to which a tile is to be cut, wherein the measuring members are mounted for both rectilinear and angular movement relative to one another, said measuring device including first locking means operable to lock said first and second measuring members against relative movement, said first locking means including a manually operable locking member which is moveable between a lock position and a release position, and second locking means operable to lock said measuring members against relative angular movement and including a manually operable second locking member moveable between a lock position and a release position, said first locking member when in its lock position preventing movement of said second locking member between said lock and release positions, and a cutting device comprising a base, a cutter, guide means for guiding movement of said cutter along a defined path across said base, and a formation on said base to receive said first measuring member of said measuring device and to position the same in alignment with said defined path, whereby a tile placed in edge contact with said second measuring member of said measuring device is automatically positioned for cutting substantially to the required size by said cutter.

2. The apparatus according to claim 1, wherein one of said measuring members comprises a stem portion and at least one arm extending laterally therefrom, and the other measuring member is mounted on said stem portion for rectilinear and angular movement relative thereto.

3. The apparatus according to claim 1, wherein said first locking means is in the form of a clamp and clamps said measuring members together when said first locking member is in its lock position.

4. The apparatus according to claim 1, wherein said first locking means is in the form of a clamp and clamps said measuring members together when said first locking member is in its lock position, and the clamping action is performed by means of a cam surface on said first locking member.

5. The apparatus according to claim 1, wherein said first locking means includes a clamp element mounted on one of said measuring members and including a first recess in which the other of said measuring members is received, and said other measuring member is urged against a wall of said first recess when said first locking member is in its lock position, and said second locking means comprises a mounting element which is angularly fixed relative to one of said measuring members and which is rotatably received in a second recess in the other of said measuring members, and said second locking member is carried by said mounting element for movement towards and away from a side wall of said second recess.

6. An apparatus for cutting tiles or similar items to size, comprising:

a measuring device having first and second measuring members which are movable towards and away from each other to set a required size to which a tile is to be cut, wherein said second measuring member has a measuring edge and a lower surface, and is provided at said measuring edge with at least one projection which is mounted for pivotal movement between a first, measuring position in which said projection depends below said lower surface of said second measuring member and a surface of said projection lies flush with said measuring edge of said second measuring member, and a second position in which said projection lies flush with said lower surface of said second measuring member said measuring device including locking means operable to lock said first and second measuring members against relative movement, said locking means including a manually operable locking member which is moveable between a lock position and a release position; and a cutting device comprising a base, a cutter, guide means for guiding movement of said cutter along a defined path across said base, and a formation on said base to receive said first measuring member of said measuring device and to position the same in alignment with said defined path, whereby a tile placed in edge contact with said second measuring member of said measuring device is automatically positioned for cutting substantially to the required size by said cutter.

* * * * *